(12) United States Patent
Rousseau et al.

(10) Patent No.: US 12,311,432 B2
(45) Date of Patent: May 27, 2025

(54) MECHANICAL PART WITH PRE-INTEGRATED THROUGH-FASTENING ELEMENT

(71) Applicant: SAFRAN AIRCRAFT ENGINES, Paris (FR)

(72) Inventors: Claire Hélène Rousseau, Moissy-Cramayel (FR); Eric Joseph Goossens, Moissy-Cramayel (FR); Matthieu Vial, Moissy-Cramayel (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 0 days.

(21) Appl. No.: 18/246,236

(22) PCT Filed: Sep. 22, 2021

(86) PCT No.: PCT/FR2021/051622
§ 371 (c)(1),
(2) Date: Mar. 22, 2023

(87) PCT Pub. No.: WO2022/064137
PCT Pub. Date: Mar. 31, 2022

(65) Prior Publication Data
US 2023/0356288 A1 Nov. 9, 2023

(30) Foreign Application Priority Data
Sep. 24, 2020 (FR) ........................................ 2009732

(51) Int. Cl.
*B21J 15/02* (2006.01)
*B21J 15/14* (2006.01)
*B21J 15/32* (2006.01)

(52) U.S. Cl.
CPC ............. *B21J 15/142* (2013.01); *B21J 15/02* (2013.01); *B21J 15/32* (2013.01); *F16B 2200/506* (2018.08); *F16B 2200/63* (2023.08)

(58) Field of Classification Search
CPC . B21J 15/02; B21J 15/14; B21J 15/142; B21J 15/32; F16B 19/08; F16B 41/00; F16B 2200/63; F16B 2200/506
See application file for complete search history.

(56) References Cited

U.S. PATENT DOCUMENTS

| 5,395,194 A | 3/1995 | Johnson et al. |
| 5,743,692 A | 4/1998 | Schwarz |

(Continued)

FOREIGN PATENT DOCUMENTS

| DE | 4310002 C1 | 4/1994 |
| EP | 2853816 A1 | 4/2015 |

OTHER PUBLICATIONS

International Search Report for issued in Application No. PCT/FR2021/051622 dated Jan. 21, 2022.

(Continued)

*Primary Examiner* — Daniel J Wiley
(74) *Attorney, Agent, or Firm* — McDonald Hopkins LLC

(57) ABSTRACT

A mechanical part includes a part body provided with a through-opening, and a through-fastening element including a rod engaged in the through-opening and connected to an inner surface of the through-opening by a support fastened to the rod of the through-fastening element and to the inner surface of the through-opening and configured to break the link between the rod of the through-fastening element and the inner surface of the through-opening, under the effect of a thrust applied on the through-fastening element so as to push the rod of the latter into the through-opening. Due to the fact that the through-fastening element is pre-integrated with the mechanical part, the logistical management prior to (Continued)

assembly of the mechanical part to another mechanical part is simplified, the risk of operator errors and loss of the fastening element are reduced.

10 Claims, 2 Drawing Sheets

(56) References Cited

U.S. PATENT DOCUMENTS

| | | | | |
|---|---|---|---|---|
| 6,039,525 | A * | 3/2000 | Johnson | F16B 41/002 |
| | | | | 411/512 |
| 7,029,221 | B2 * | 4/2006 | Kovac | F16B 19/02 |
| | | | | 411/512 |
| 7,073,997 | B2 * | 7/2006 | Kovac | F16B 5/0258 |
| | | | | 411/512 |
| 2013/0142588 | A1 * | 6/2013 | Slater | F16B 41/002 |
| | | | | 411/352 |
| 2015/0023756 | A1 | 1/2015 | Young | |
| 2018/0142714 | A1 * | 5/2018 | Owens, II | F16B 5/0283 |
| 2020/0109734 | A1 * | 4/2020 | Slater | F16B 19/02 |

OTHER PUBLICATIONS

Written Opinion for PCT/FR2021/051622 dated Jan. 21, 2022.
Search Report issued in French Patent Application No. 2009732 dated Jun. 8, 2021.

* cited by examiner

MECHANICAL PART WITH PRE-INTEGRATED THROUGH-FASTENING ELEMENT

This is the National Stage of PCT international application PCT/FR2021/051622, filed on Sep. 22, 2021 entitled "MECHANICAL PART WITH PRE-INTEGRATED THROUGH-FASTENING ELEMENT", which claims the priority of French Patent Application No. 2009732 filed Sep. 24, 2020, both of which are incorporated herein by reference in their entireties.

TECHNICAL FIELD

The present invention relates to a mechanical part, as well as a method for manufacturing such a mechanical part and a method for assembling such a mechanical part to another mechanical part.

PRIOR ART

In many fields of mechanics, parts are assembled using through-fastening elements such as rivets or bolts. These fastening elements are attached during operations for assembling the parts to each other.

This way of proceeding therefore requires the prior provision of sets of such fastening elements, which requires specific consideration in the supply chain.

In addition, this way of proceeding generates risks of assembly errors, as well as risks of loss of fastening elements in the assembly enclosure or room, from which there may result risks of damage, as well as risks of increased weight, which can be particularly penalising in certain contexts, for example in the case of operations involving aircraft.

DISCLOSURE OF THE INVENTION

The object of the invention is to provide a simple, economical and effective solution to this problem.

It proposes for this purpose a mechanical part, comprising a part body provided with a through-opening, and comprising a through-fastening element including a rod engaged in the through-opening and connected to an inner surface of the through-opening by a support fastened to the rod of the through-fastening element and to the inner surface of the through-opening, and configured to break the link between the rod of the through-fastening element and the inner surface of the through-opening, under the effect of a thrust applied on the through-fastening element so as to push the rod of the latter into the through-opening.

Due to the fact that the through-fastening element is thus pre-integrated in its through-opening within the mechanical part, the logistical management prior to assembly of the mechanical part to another mechanical part is simplified by means of the through-fastening element. In addition, the risk of error is reduced for the operators, as is the risk of losing the fastening element.

Of course, the mechanical part can include a plurality of through-openings and a plurality of corresponding fastening elements pre-integrated in these openings in the manner indicated above. The optional provisions detailed below may in this case apply to all or a portion of the set of these fastening elements.

In addition, there may be several supports for the same through-fastening element. The optional provisions detailed below can in this case apply to all supports or to certain supports, for a given fastening element.

In a preferred embodiment of the invention, the through-fastening element is a rivet or a threaded rod.

Preferably, the support is fastened to a side surface of the rod of the through-fastening element.

The invention further relates to a propulsion assembly for an aircraft including a mechanical part of the type described above.

The invention also relates to an aircraft including a mechanical part of the type described above.

The invention also relates to a method for manufacturing a mechanical part of the type described above, comprising the manufacture of the part body, of the through-fastening element, and of the support, by an additive manufacturing technique.

Additive manufacturing techniques allow to manufacture all the aforementioned elements in a particularly simple manner.

The invention also relates to a method for assembling a mechanical part of the type described above to another mechanical part, wherein the other mechanical part comprises another part body provided with another through-opening, the method comprising the following steps:

A) positioning the mechanical part and the other mechanical part so as to align the through-opening of the mechanical part with the other through-opening of the other mechanical part; then B) applying a thrust on the through-fastening element, so as to break the link between the rod of the through-fastening element and the inner surface of the through-opening, and to push the rod of the through-fastening element into the through-opening and into the other through-opening; then C) fastening the mechanical part to the other mechanical part by means of the through-fastening element.

Preferably, the through-fastening element is a rivet or threaded rod, and the thrust of step B is applied on a head of the through-fastening element.

In the case where the through-fastening element is a rivet, step C is a riveting operation.

In the case where the through-fastening element is a threaded rod, step C comprises tightening a nut on one end of the through-fastening element opposite to the head of the latter. In other words, step C in this case is a bolting operation.

BRIEF DESCRIPTION OF THE DRAWINGS

The invention will be better understood, and other details, advantages and features thereof will appear upon reading the following description given by way of non-limiting example and with reference to the appended drawings wherein.

DETAILED DESCRIPTION OF PREFERRED EMBODIMENTS

Figure 1:
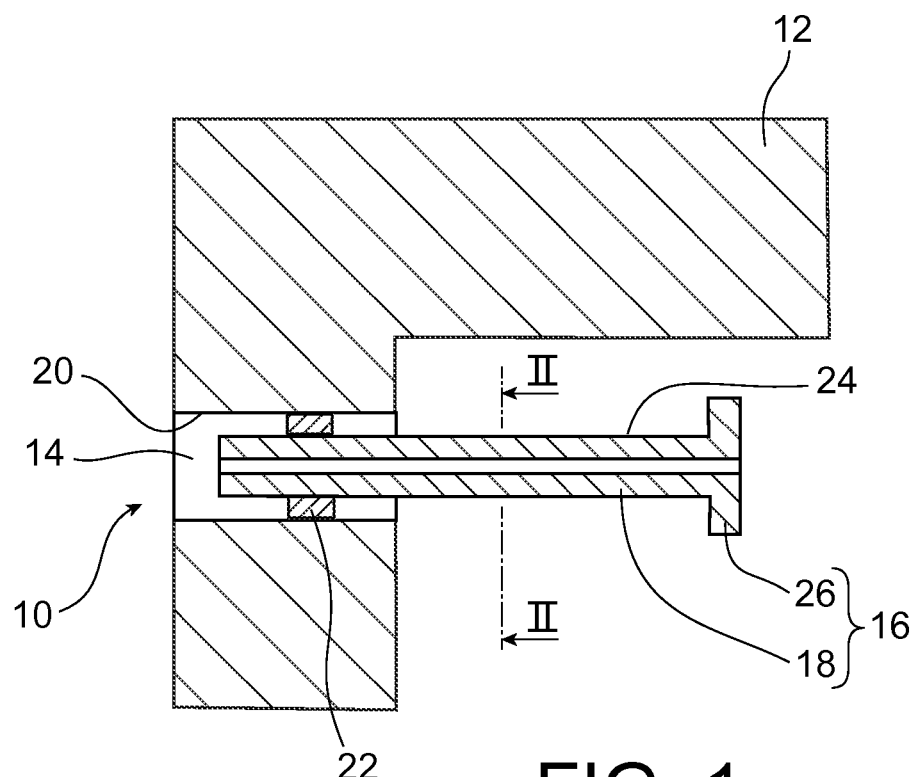
FIG. 1 is a schematic view of a mechanical part according to a preferred embodiment of the invention, in section along the plane I-I of FIG. 2.
Figure 2:
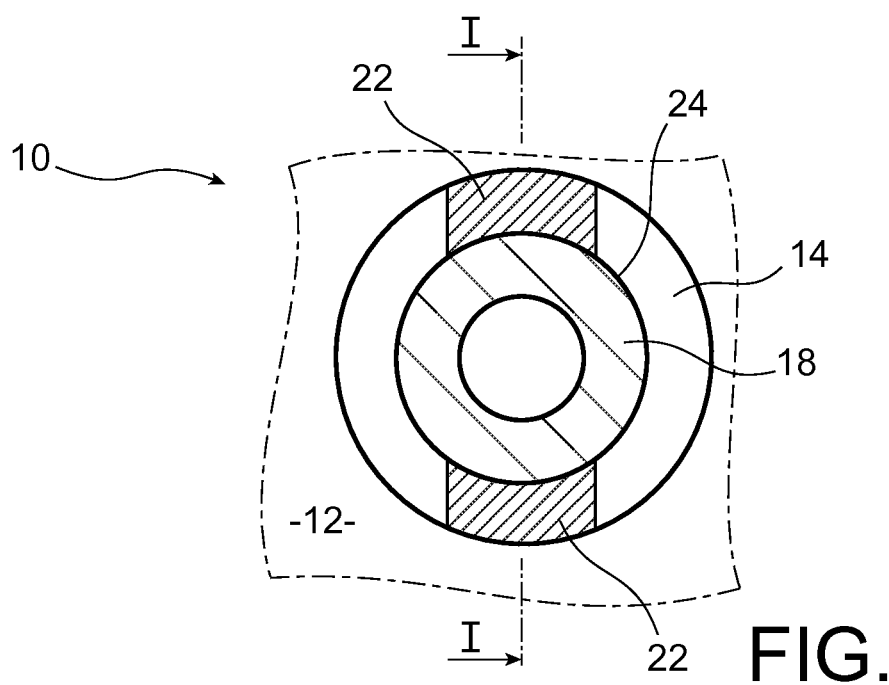
FIG. 2 is a schematic view of the mechanical part of FIG. 1, in section along the plane II-II of FIG. 1.

FIGS. 1 and 2 illustrate a mechanical part 10, which is for example intended to enter into the constitution of a propulsion assembly for an aircraft or of an aircraft. For example, the mechanical part 10 constitutes a fitting for an aircraft floor.

The mechanical part 10 comprises a part body 12 provided with a through-opening 14 intended for the assembly of the part 10 to another mechanical part by riveting or bolting, or more generally by any technique based on the use of through-fastening elements.

It is proposed, according to the invention, that such through-fastening elements are pre-integrated into the mechanical part 10 during the manufacture of the latter, this manufacture preferably being implemented by means of an additive manufacturing technique, for example by laser fusion on a powder bed.

The mechanical part 10 thus further comprises a through-fastening element 16, which includes a rod 18 engaged in a corresponding through-opening 14. It should be understood by this that the rod 18 extends over a portion of the length of the through-opening 14, as shown in FIG. 1, or, alternatively, that the rod 18 passes through the through-opening 14 on either side.

In all cases, the rod 18 is connected to an inner surface 20 of the through-opening 14 by at least one support 22 which is fastened, on the one hand, to the rod 18 of the through-fastening element, and on the other hand, to the inner surface 20 of the through-opening.

The support 22, or if applicable, the set of supports 22 connected to the rod 18, is configured to break the link between the rod 18 of the through-fastening element and the inner surface 20 of the through-opening, under the effect of a thrust applied on the through-fastening element 16 so as to push the rod 18 of the latter into the through-opening 14.

Thus, it should be understood that the support 22 is designed and sized as accurately as possible to allow the through-fastening element 16 to be held in position during handling of the mechanical part, and to break, or to detach from the rod 18 and/or the inner surface 20 of the through-opening, during the application, on the through-fastening element 16, of a thrust force, for example a shock, which is of appropriate level to push this fastening element into the hole without damaging this fastening element.

To this end, the support 22 is a relatively thin structure compared to the through-fastening element 16 and/or a lightened structure such as a honeycomb structure.

In the preferred case wherein the mechanical part 10 is produced by an additive manufacturing technique, the part body 12, the through-fastening element 16 and the support 22 (or the set of supports 22) can be formed integrally from the same material. Alternatively, different materials can respectively be used to constitute these elements.

The support 22 is preferably connected to a side surface 24 of the rod 18 of the through-fastening element. In the preferred case wherein the mechanical part is produced by an additive manufacturing technique, it should be understood by this that the support 22 forms a projecting structure on said lateral surface 24.

In the example illustrated, the rod 18 of the through-fastening element visible in FIGS. 1 and 2 is connected to the inner surface 20 of the corresponding through-opening by two supports 22 of the type described above, which are diametrically opposite with respect to a longitudinal axis of the through-opening 14.

In addition, in the example illustrated, the through-fastening element 16 is a rivet, intended for assembly by riveting. Alternatively, the through-fastening element 16 may be a threaded rod, for assembly by bolting. In both cases, the through-fastening element 16 therefore includes a head 26 arranged at one end of the rod 18 of the element.

Figure 3:
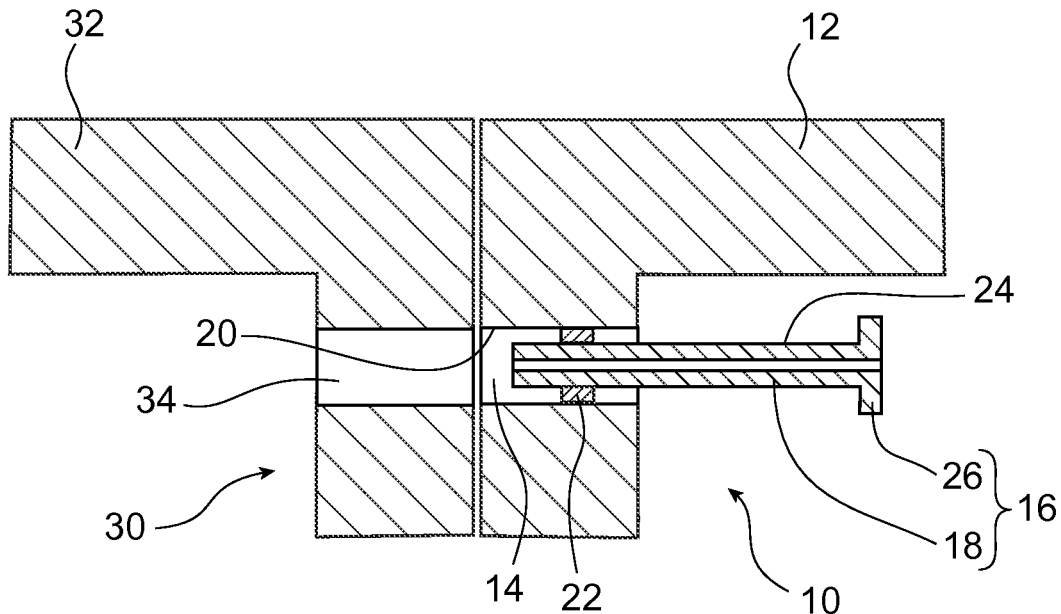
FIG. 3 is a view similar to FIG. 1, showing the mechanical part of FIG. 1 and another mechanical part, during the implementation of an assembly method according to a preferred embodiment of the invention.
Figure 4:
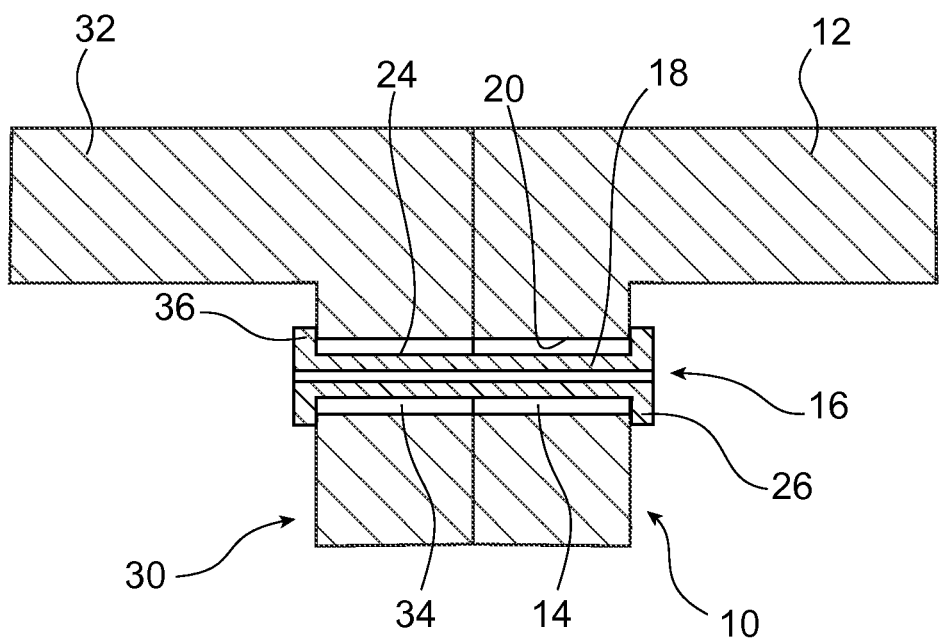
FIG. 4 is a view similar to FIG. 3, after the implementation of the method.

With reference to FIGS. 3 and 4, the mechanical part 10 can be assembled to another mechanical part 30, comprising another part body 32 provided with another through-opening 34, by means of an assembly method comprising the following steps:

A) positioning the mechanical part 10 and the other mechanical part 30 so as to align the through-opening 14 of the mechanical part 10 with the other through-opening 34 of the other mechanical part 30; then B) applying a thrust, for example a shock, on the through-fastening element 16, in this case on the head 26 of the latter, so as to break the link between the rod 18 of the through-fastening element 16 and the inner surface 20 of the through-opening 14, previously ensured by the support(s) 22, and push the rod 18 of the through-fastening element 16 into the through-opening 14 and into the other through-opening 34 (FIG. 3); then C) fastening the mechanical part 10 to the other mechanical part 30 by means of the through-fastening element 16 (FIG. 4).

In the example illustrated, wherein the through-fastening element 16 is a rivet, step C is a riveting operation consisting, in general, in widening the end of the rod 18 opposite the head 26 by crushing so as to form a second head 36 allowing reciprocal tightening of the mechanical parts 10 and 30.

Alternatively, in the case where the through-fastening element 16 is a threaded rod, step C comprises the tightening of a nut on one end of the through-fastening element 16 opposite to the head 26 of the latter, again so as to obtain reciprocal tightening of the mechanical parts 10 and 30.

In general, pre-integrating the fastening element 16 into the mechanical part 10 allows to considerably simplify the logistics management, up to the assembly of the mechanical part to another mechanical part by means of the through-fastening element 16, while reducing the risk of error for operators as well as the risk of loss of fastening element.

Throughout the description and the claims, except when it is stipulated otherwise or when obvious technical reasons prevent it, the use of the singular indefinite articles "a" and singular definite articles "the" with respect to a given element or a given step does not exclude the possibility that there may be a plurality of such elements or steps.

In particular, the mechanical part 10 can of course include several through-openings and several corresponding through-fastening elements, pre-integrated into the mechanical part 10 according to the methods described above, to allow the assembly of the mechanical part 10 to one or more other mechanical parts.

What is claimed is:

1. A mechanical part, comprising:
   a part body provided with a through-opening; and
   a through-fastening element including a rod engaged in the through-opening and connected to an inner surface of the through-opening by a support,
   wherein the part body, the support, and the through-fastening element are formed as a single piece, and
   wherein the support is configured to break under the effect of a thrust applied on the through-fastening element so as to push the rod of the latter into the through-opening.

2. The mechanical part according to claim 1, wherein the through-fastening element is a rivet or a threaded rod.

3. The mechanical part according to claim 1, wherein the support is connected to a side surface of the rod of the through-fastening element.

4. A propulsion assembly for an aircraft, including a mechanical part according to claim 1.

5. An aircraft, including a mechanical part according to claim 1.

6. A method for manufacturing a mechanical part according to claim 1, comprising the manufacture of the part body, the through-fastening element, and the support, as a single piece by an additive manufacturing technique.

7. A method for assembling a mechanical part according to claim 1 to another mechanical part, wherein the other mechanical part comprises another part body provided with another through-opening, the method comprising the following steps:
- A) positioning the mechanical part and the other mechanical part so as to align the through-opening of the mechanical part with the other through-opening of the other mechanical part; then
- B) applying a thrust on the through-fastening element so as to break the support and to push the rod of the through-fastening element into the through-opening and into the other through-opening; then
- C) fastening the mechanical part to the other mechanical part by means of the through-fastening element.

8. The method according to claim 7, wherein the through-fastening element is a rivet or threaded rod, and wherein the thrust of step B is applied on a head of the through-fastening element.

9. The method according to claim 8, wherein the through-fastening element is a rivet, and wherein step C is a riveting operation.

10. The method according to claim 8, wherein the through-fastening element is a threaded rod, and wherein step C comprises tightening a nut on one end of the through-fastening element opposite to the head of the latter.

* * * * *